United States Patent [19]

Niconchuk

[11] 4,317,692
[45] Mar. 2, 1982

[54] INSIDE REPAIR FOR TUBELESS TIRE AND METHOD FOR APPLYING SAME

[76] Inventor: Alec W. Niconchuk, 267 Lowell St., Peabody, Mass. 01960

[21] Appl. No.: 142,358

[22] Filed: Apr. 21, 1980

[51] Int. Cl.³ ............................................. B60C 21/06
[52] U.S. Cl. ..................................... 156/97; 152/370
[58] Field of Search ...................... 152/367, 370, 371; 156/97

[56] References Cited

U.S. PATENT DOCUMENTS

| | | | |
|---|---|---|---|
| 1,608,234 | 11/1926 | Reeve | 152/367 |
| 1,629,335 | 5/1927 | Brady et al. | 152/367 |
| 2,646,707 | 7/1953 | Notz | 152/367 |
| 2,943,969 | 7/1960 | Boyer et al. | 152/367 |
| 4,109,697 | 8/1978 | Wolfe | 156/97 |

Primary Examiner—John E. Kittle
Attorney, Agent, or Firm—Robert B. Russell

[57] ABSTRACT

An inside repair for tubeless tires is provided wherein a measured amount of an air (or moisture) curing elastomeric adhesive is applied to the cleaned and primed inner surface of the tire over the puncture hole, a porous path is placed over the adhesive and the adhesive is then forced into the puncture hole by use of a cup-shaped tool lined with a release material. After the material has cured sufficiently to form a substantial skin, the tire is inflated. Thereafter, the repair cures fully with the tire in the strained condition of inflation. The elastomer is of low durometer and is compatible for adhesion to rubber.

8 Claims, 5 Drawing Figures

INSIDE REPAIR FOR TUBELESS TIRE AND METHOD FOR APPLYING SAME

FIELD OF THE INVENTION

This invention relates to the repair of punctures in rubber tires, and more particularly to repairing punctures in tubeless tires from the inside by what are commonly called "inside repairs."

BACKGROUND OF THE INVENTION

It is extremely difficult to make an effective inside repair. One of the principal reasons for this is that the vulcanized inner surface of a tubeless tire is a difficult surface to which to make a bond. This is due not only to the ribs on the surface, its imperviousness, and the completely cross-linked nature of the rubber material, but also to the presence of talc or other contaminants on the surface, as well as to a microscopic and extremely difficult to remove penetration into the rubber of the mold release employed in the manufacture of the tire. It is, of course, possible to abrade the tire's inner surface and remove the contaminated layer with an abrasive in order to provide "clean rubber" and an anchoring surface for an adhesive, but such a procedure is undesirable as it weakens the tire and promotes delamination of the plies besides being time consuming. In addition, even with a roughened surface a true, chemical bond still cannot be made to rubber. The crevices in a roughened surface provide a form of mechanical linkage or interlocking which gives an appearance of a good bond, but the bond is not, in fact, really a strong chemical bond at any specific microscopic point on the surface.

As a a result, making inside repairs of tubeless tires has never, to date, been entirely satisfactory. In one method, the puncture hole is reamed out and an adhesively coated rubber plug is inserted under pressure into the hole with the adhesive serving both to hold the plug in the hole and to seal the gap between the plug and the tire. Besides causing damage to the tire from the reaming, especially for steel belted radials, such plug repairs tend to cause growth of cracks adjacent to the puncture hole. When rubber is pierced, the incision is never clean, but instead forms a star-like cluster of cracks which are accentuated by the reaming. These cracks will develop into tears if stretched and since the rubber plug will not provide a good seal unless it is confined under high pressure in the puncture hole, such plugs tend to elongate the cracks. Also if the pucture takes the form of an elongated cut, as is often the case, plugs are not suitable for repairing same. As a result, the plug-type repair is not universally applicable and is not highly regarded.

Another way to make an inside repair is by placing an impervious patch over the puncture hole on the inside of the tire and attempting to adhere it to the tire. To date an effective adhesive for this purpose (as far as the inventor hereof is aware) has not been developed. A good bond cannot be made without pressure, but pressure tends to squeeze out the adhesive so much that the bond is lost. Attempting to do it with a vulcanized adhesive has met with only limited success. Even if high heat and pressure are used (which incidentally are necessary for vulcanization), so much of the adhesive squeezes out through the puncture hole and laterally of the patch that the bond is lost. Serrating the surface helps retain some of the adhesive and a fairly good bond can be made, but as we have noted above, even the serrations do not provide anything more than a mechanical interlinkage, not a true chemical bond. As a result the patch-type seal is prone to failure.

One attempt to solve these problems is described in U.S. Pat. No. 4,109,697 in which a layer of vulcanizable "rubbery material" was applied over the puncture hole on the inside of the tire. Next an "O" ring was placed around the puncture hole over the "rubbery material," and a patch was placed on top of the "O" ring. Thereafter hot steam, or steam and air under pressure, were applied to the repair while means on the outside of the puncture were employed to keep the adhesive from flowing out of the puncture hole. How the pressurized steam was to be applied to the surface is not stated in the patent. The outward flow of material out of the puncture hole is described as being prevented by a seal, but how the seal was to be adhered to the tire is not described. The "O" ring is described as preventing the lateral flow of the rubbery material on the inside surface of the tire. It is not known, however, whether the repair of U.S. Pat. No. 4,109,697 was practical. At least one can state with assurance that applying hot pressurized steam to an inside puncture would be both difficult and expensive. Also, effectively to seal the outside of the puncture hole is not only very hard to do, but would be time consuming and expensive. Further, whether or not an "O" ring can actually prevent the lateral flow of the rubbery material under the pressures involved is questioned. For example, in U.S. Pat. No. 4,109,697, vulcanizing temperatures of 200° F. and 250° F. are mentioned. Actually, 200° F. is essentially too low for vulcanizing, and even 250° F. is marginal, but yet, to maintain steam at 250° F., a pressure of 15 psi above atmosphere is needed. At such a pressure all of the adhesive would be squeezed out. On the other hand, U.S. Pat. No. 4,109,697, even if of questionable practicality, at least demonstrates a recognition of (a) the need to form the bond under high heat and pressure, (b) the need to prevent the adhesive from being squeezed out of the adhesion area, laterally and axially of the puncture, and (c) the desireability of providing a repair which avoids reaming out the hole or serrating the surface and which can be employed with puncture of different sizes and shapes.

Another factor, however, is involved, of which the prior art appears to have been unaware, relating to the condition of strain between the sealing material and the tire while the tire is in use. In all prior art repairs (known to the inventor hereof), the repair is cured in one condition of strain and used in another. This is a distinct disadvantages because at best, the adhesive bond is weak, and any residual strain in the repair tends to loosen the bond between the repair and the tire under the rigorous conditions of flexing during use. This disadvantage, however, exists in all prior art repairs of which the inventor hereof is aware. For example, in the plug-type repair the plug remains under high compression in the puncture with the attendant disadvantages mentioned above. In the patch-type repair the vulcanization takes place under vertical stress with the tire deflated. Thereafter when the tire is inflated, the tire stretches both longitudinally and laterally introducing strain in the patch which tends to pull it away from the inner surface of the tire. In the repair of U.S. Pat. No. 4,109,697, the adhesive likewise cures while the tire is deflated, and the cracks surrounding the puncture are held tightly closed due to the surrounding rubber, in which condition, penetration of the "rubbery" material into the cracks even under pressure is virtually impossible. Thereafter when the tire is inflated, the stretching of the tire opens up the cracks surrounding the puncture hole, and pulls the rubber of the tire away from the "rubbery" material of the repair at the critical point. In all such prior art repairs, the vulcanized bonding material is permanently cross-linked in a condition of strain which changes when the tire is inflated. As a result, the repair is constantly under a strained condition in use, which condition promotes pulling away of the seal from the rubber of the tire. In addition, if the repair is made to an unsuitably large cut, in the prior art repairs nothing warns the user of it. Such a tire will tend to hold its shape and will appear normal until it is used, and the user is left to find out the hard way, i.e., by a blow-out on the road, that the repair is ineffective.

Accordingly, among the objects of the present invention are to provide an inside repair in which a permanent bond of an impervious material is made in a puncture hole of random shape under conditions designed to promote as near to a chemical bond to the rubber of the tire as possible without squeezing the bonding material out of the critical bonding area. Another object is to provide a seal for an inside repair in which the bonding material of the seal is cured in such a way as to reduce to a minimum all residual strain in the bonding material during use. A further object is to provide an inside repair which fully seals the cracks surrounding a randomly shaped hole as they exist in the stretched state of tire inflation. Still another object is to provide such a repair which can be made to a tire inexpensively and without either reaming out the hole or roughening the inner surface of the tire. An even further object is to provide an inside repair for randomly sized and shaped cuts which provides a visible indication, prior to road testing, of whether the reinforcing of the tire has been damaged too much or the cut is too large to be safely repaired by the method of the invention.

BRIEF DESCRIPTION OF THE INVENTION

In an illustrative embodiment of the invention, an air-curing elastomeric adhesive of very low durometer (i.e. 20–30 Shore A); and compatability to rubber (i.e. polysiloxane elastomer) is employed. First, after cleaning the surface thoroughly, a primer is applied. Next, a measured amount of the adhesive is applied to the puncture. A porous patch of fabric (burlap being preferred) is then applied to the adhesive, and a concave cup-shaped tool lined with a layer of release paper is then employed to press the burlap down and thereby to force adhesive well into the puncture. At this point, since the burlap is porous, the adhesive starts to cure due to contact with the air either by drying, oxidation, or from the moisture in the air, depending upon the type of adhesive employed, the important thing being that a skin starts to form. Next, after a fairly substantial skin has formed, the tire is inflated employing an air pressure slightly in excess of the designed pressure (i.e., 2 to 5 psi). If the tire is inflated too soon, the adhesive will be blown out of the puncture hole and the seal will be lost. If the tire is inflated too late, the adhesive will not be capable of flowing fully into the expanded cracks surrounding the puncture hole. Also, the bond will not be formed under pressure as desired and the residual strains in the cured adhesive material during use, will not be eliminated. The proper degree of skin formation is as follows. A sufficiently cured skin must form together with the burlap to act as an impermeable membrane when the air pressure of inflation is applied. Also a sufficiently viscous layer of adhesive must form at the bottom of the puncture hole, (and to some degree lining its walls) to establish an effective back pressure in the puncture hole so as to assure that the adhesive will be forced into the expanded cracks, and that the bond in the puncture will form under pressure.

In practice, after a proper skin has been formed and the tire has been inflated, some of the still liquid adhesive under the burlap, will be forced down into the expanded cracks and squeezed to a limited degree out through the puncture hole, but the non-liquid, partially cured part (i.e., the skin) not only adjacent to the burlap but at the bottom of the puncture hole, does not squeeze out and provides the back pressure. The entire bond between the adhesive of the repair and the rubber of the tire is then formed under pressure with the adhesive being bonded to completely clean "rubber" in the puncture hole and in its cracks in their expanded, inflated state. Of course, immediately after inflation, the tire should not be used until the adhesive has been allowed to cure. Since the repair thereafter cures with the tire in a slightly over-inflated condition, the repair material remains from then on, in use, under virtually no strain but for a slight compression which helps maintain the seal and compensates for such stretching as is introduced when the tire hits a bump.

Further features of the invention include its adaptability for size or shape (including irregularity) of cut, its lack of requirement for abrading the tire surface, or reaming out the puncture hole. The invention is inexpensive, simple, easy to use, and requires no expensive presses, heat or steam, or difficult to apply seals. Moreover, it provides an effective inside repair that has withstood extensive, severe road testing.

In addition to providing a repair which is essentially free of residual strain while the tire is in a condition of rest, the durometer of the adhesive is so low (i.e., 20–30 Shore A) that when the tire flexes in use, and the repair is subjected to alternate tension and compression in the area of the puncture caused by the bending of the tire, the adhesive of the repair readily yields, and, even though a true chemical bond is not achieved, the tension at the bond is well under the strength of such bond as is achieved, particularly within the puncture hole where the bond is formed under pressure and in contact with clean rubber totally free of talc, mold release, or other contaminants. As a result, a good seal is maintained under rigorous conditions of use.

In addition, since there is virtually no residual strain in the cured adhesive (other than slight compression) with the tire in the inflated state, and the reinforcing within the tire remains intact (but for such damage as the puncture may have caused), there is little or no tendency for the cracks adjacent to the puncture hole to tear or spread.

A still further feature is that the repair of the present invention provides a visible indication of when an effective seal cannot be made. Thus, if the repair of the present invention is applied to a place in a tire where the reinforcing has been damaged too much or to a cut which is too large, when the tire is inflated with the adhesive in the partially cured state, the walls of the damaged area or the oversized puncture will spread, there will be insufficient back-pressure in the puncture hole, and the adhesive will either blow out of the puncture hole through the burlap, or there will be a tell-tale bulge on the outer surface of the tire. In either case, the user is given a visible warning short of road testing, that the puncture is not suitable for effective repairing by the present invention. The use of a slight excess of air pressure (e.g., 2–5 psi) during the final curing stage, is employed in order to provide a greater margin of error for this purpose.

DESCRIPTION OF THE DRAWINGS

An illustrative embodiment is shown in the accompanying drawings in which.

DETAILED DESCRIPTION OF THE INVENTION

Figure 1:
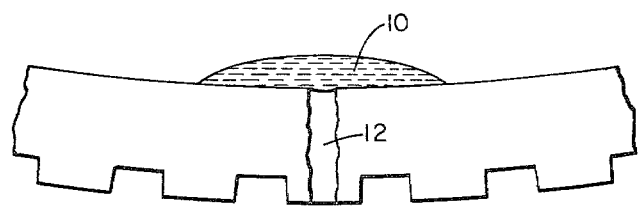
FIG. 1 is a diagrammatic view in cross section of a portion of a tire showing a puncture hole and a layer of adhesive thickly applied to the inside surface of the tire over the puncture hole according to the first step of the invention, the size of the puncture hole being exaggerated for purposes of illustration and discussion.

In an illustrative embodiment of the invention, a repair is made as follows. First, a punctured tire is removed from its rim, the inside of the puncture hole is located, thoroughly cleaned with a suitable solvent (methanol or aqueous solutions thereof) and coated with a primer (e.g. Dow Corning 1200 Primer). Next an air-elastomeric adhesive 10 is applied in a measured amount over the puncture hole 12 as illustrated in FIG. 1 in which the puncture hole 12 is shown with exaggerated dimensions for purposes of illustration and discussion. It will be understood also that the hole may be of irregular shape. The amount of adhesive is calculated to be sufficient for the application of pressure to the puncture hole by use of a cup-shaped tool 16 to be more fully described below. In practice, a puncture hole when viewed microscopically normally takes the shape of a slit or a star shaped cluster of slits. Sometimes a large slit will terminate in a fanned out cluster of smaller slits. Such a puncture hole is assumed but not illustrated.

A preferred adhesive is a polysiloxane sealant in which the curing action is brought about at atmospheric moisture. Typical examples are sold by General Electric Co. under designation numbers RTV 102, 103, 106, 108 or 109 and by Dow Corning Co. under designations Silastic 140, 732, 781, 782 or 899. The durometer of the cured adhesive is preferably in the range of 20 to 30 pts on the Shore A scale, and has an extrusion rate of no less than about 300 grams/min though an $\frac{1}{8}''$ orifice at 90 psi, at room temperature. A tensile strength of over 100 psi and an elongation of over 300% are preferred. Other adhesives which cure upon exposure to the atmosphere (either by drying, atmospheric moisture or oxidation) which exhibit these physical properties can be used, provided they also have good affinity to rubber. The polysiloxanes are especially suitable because they retain their resilience and low durometer over a wide range of temperatures (ie from $-80°$ F. to $450°$ F.), and are uniquely resistant to ozone, and ultraviolet radiation which make them good for long term exposure to weather.

Figure 2:
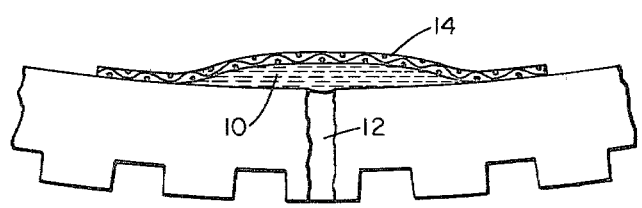
FIG. 2 is a diagrammatic view showing a porous fabric patch in place over the adhesive of the elements of FIG. 1.

After the measured amount of adhesive 10 has been applied over the puncture hole 12, a patch of a porous material 14 is placed over the adhesive 10 as in FIG. 2. The patch may be any flexible, porous material, but it is preferably pliable and relatively weak. A preferred material is an open weave burlap (8 to 10 mesh). The porosity is needed to assure access of the atmosphere to the adhesive. The strength of the repair of the present invention relies primarily upon the strength remaining in the tire surrounding the puncture and not upon the tensile strength of either the patch 14 or the adhesive 10. Thus, the present repair is not intended to repair a large cut which would be prone to blowing out in use. Thus, the patch 14 and adhesive 10 are not intended to provide either a substitute for or a supplement to the remaining reinforcement in the tire. In fact, the patch 14 and adhesive 10 are specifically selected to be weak, so that a dangerously damaged tire will not appear to be repaired by them prior to road testing as will be more fully described below. In addition, the patch 14 should be sufficiently open and loose to place as little as possible stress on the adhesive when the tire is being flexed in use. A suitable material is an open weave burlap.

Figure 3:
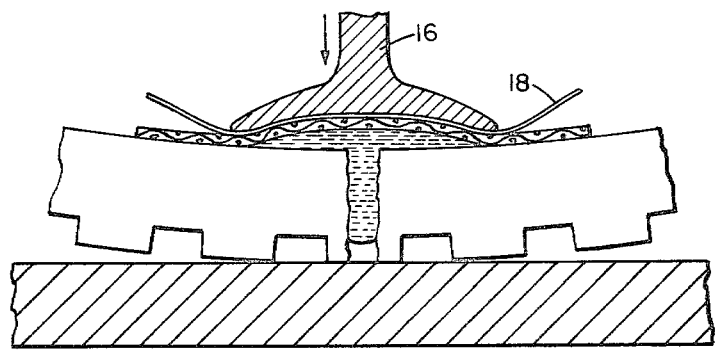
FIG. 3 is a diagrammatic view showing the elements of FIG. 2 being compressed under the force of a cup-shaped tool lined with a release paper.
Figure 4:
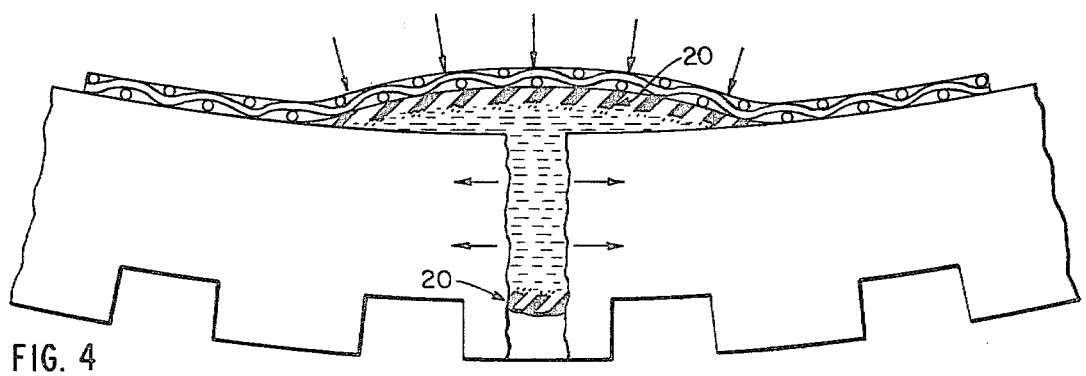
FIG. 4 is an enlarged view showing the elements of FIG. 3 after a skin has formed on the surface of the adhesive.
Figure 5:
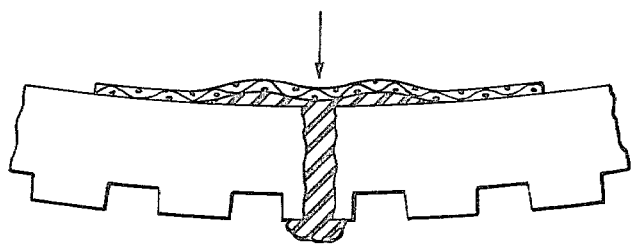
FIG. 5 is a view showing the elements of FIG. 4 after the tire has been inflated and the adhesive has been cured.

Next a concave, cup-shaped tool 16 together with a portion of release paper 18 is placed over the patch 14 and compressed against the tire so as to force the adhesive 10 down into puncture 12, as in FIG. 3. This compressing action also forces the adhesive up into the burlap against the release paper 18.

Next, the tool 16 and release paper 18 are removed and the seal is allowed to cure for one hour (if Silastic 732 is used) during which time atmospheric moisture starts the curing process and a skin indicated at 20 forms on the exposed surfaces of the adhesive adjacent to (and in) the burlap, also at the bottom of the puncture hole, and to a lesser extent along the walls of the puncture. This skin comprises an outer layer of fairly well cured adhesive beneath which the adhesive is progressively less cured toward the center of the pool. After the skin 20 has formed to an appropriate degree which will be described more in detail presently, the tire is inflated and left to cure for 24 hours.

Since the patch 14 is porous, the skin 20 must be sufficiently gelled to prevent the air pressure of inflation which is preferably 2 to 5 psi more than the designed pressure of the tire from blowing the adhesive out through the puncture hole. In addition, the adhesive at the bottom of the puncture hole 12 and lining the lower portions of the hole must be sufficiently gelled to provide enough back pressure in the puncture hole to force the adhesive into the cracks of the puncture which are expanded due to the inflation, and to insure that the adhesive bond will be formed thereafter under pressure. In some cases a small amount of liquid adhesive may gradually squeeze to a minor degree around the gelled layer at the bottom of the puncture, but its increased viscosity on exposure to the air assures maintenance of the back pressure.

Conversely, the adhesive 10 must not be so completely gelled that the pressure of the air of inflation is resisted totally by the adhesive above the puncture. In such a case no adhesive will be driven into the expanded cracks, the bond will not be formed under pressure, and a less than optimum repair will result.

In practice, using Dow Corning Silastic RTV Sealant No. 732, a suitable skin for inflation is formed in 1 hour at 70° F. and the repair is fully cured in 24 hours at 70° F. Even though the tire may appear to have been repaired immediately following inflation, it should not be used until the adhesive has cured to a substantially greater degree. At least 8 hours is considered necessary with this adhesive. Faster curing adhesives require proportionally less curing time.

Once the appropriate skin forming time for any given suitable elastomer has been determined a repair can be made, according to the invention, for a normal puncture in which sufficient reinforcing remains in the tire for safe driving (usually a cut of about ⅜"). In addition, as long as the correct repairing procedure is followed, the repair of the present invention will provide the repairman a visible indication of when a puncture is oversized. Thus, when the tire is inflated, if the tire has been overly weakened by the puncture, either the walls of the puncture hole will yield so much that the adhesive will squirt out, or a tell-tail bulge will appear on the surface of the tire around the puncture. In either case, the repair man will be warned prior to road testing that the tire is prone to failure. An air pressure in excess of the normal designed pressure for the tire by about 2 to 5 psi is employed in order to accentuate the conditions for such a warning and provide more margin for error.

When the repair is formed in accordance with the foregoing procedures, the adhesive cures while the tire is substantially in the same state of tension that exists during use. The minor amount of excess pressure employed during curing a merely compensates for the excess pressure which the tire experiences, when the vehicle goes over a bump. In this way the repair is essentially without strain during use. The small amount of compression in the repair due to the excess of air pressure during curing merely keeps the repair snug rather than tending to pull it away from the tire.

In view of the description of this preferred embodiment of the invention, various modifications will now be apparent to those skilled in the art. Other adhesives fitting the general physical requirements set forth can be used. Also the material of the patch may be varied. In addition, certain aspects of the invention are considered inventive in and of themselves. For example, the use of a weak patch material such as burlap, and an extremely soft and pliable adhesive material such as a polysiloxane sealant are considered to be per se an important combination. They are so pliant that a reasonable (although not optimum) seal can be made with them even though they are cured without inflating the tire. Accordingly, it is intended to claim them in combination per se. Likewise the steps whereby a visible indication of an oversized puncture is provided, are considered a valuable contribution apart from other details such as the nature of the adhesive, or the patch; and therefore, it too is being claimed broadly apart from the remainder. Other variations also will be apparent and therefore it is not intended to confine the invention to the precise form herein described as an illustrative embodiment but rather to limit it only in terms of the appended claims.

I claim:

1. A method for making an inside repair of a puncture, including cracks collaterally thereof, on a cleaned and primed inner surface of a tubeless tire comprising the steps of:

(a) applying an uncured but air-curing elastomeric adhesive to the inner surface of said tire over said puncture and cracks, (b) placing a porous patch over said adhesive, (c) compressing said patch and uncured adhesive while confining the flow of said adhesive to force adhesive substantially into said puncture and cracks, (d) allowing said adhesive at least partially to cure, and (e) inflating said tire while a substantial portion of said adhesive is still in the uncured state.

2. The method defined in claim 1 further characterized by;

(f) the degree of curing the step 6(d) prior to step 6(e), being controlled to form a superficial membrane in the vicinity of said patch which membrane is impermeable to air at a pressure which is slightly greater than the designed inflation pressure of said tire, said curing also being controlled to form a pressure resisting zone of high viscosity in the lower part of said puncture; and (g) maintaining the air pressure of step 6(e) slightly greater than the designed inflation pressure of said tire;

whereby step 6(e) forces fluid adhesive into said puncture and cracks with said zone of high viscosity providing backpressure to the flow thereof.

3. The method defined in claim 2 further characterized by;

(h) completely curing the adhesive, and (i) reducing the air pressure in the tire to its designed pressure.

4. The method defined in claim 1 further characterized by;

(j) performing step 6(c) with a measured quantity of said adhesive and employing a circular cup-shaped element which applies pressure first at its rim and then confines the adhesive under pressure within its cup as further compression is applied.

5. The method defined in claim 1 further characterized by;

(k) the adhesive of step 6(a) being selected from the group of skin-forming adhesives comprising adhesives which cure on loss of moisture to the air, adhesives which cure on exposure to oxygen, and adhesives which cure upon the acquisition of atmospheric moisture.

6. The method defined in claim 5 further characterized by;

(l) the adhesive of step 5(k) having a durometer hardness (Shore A scale) of between about 10 and 30; a tensile strength of about 100 psi to 500 psi; and an elongation of at least about 300%.

7. The method defined in claim 1 further characterized by;

(m) the adhesive of step 1(a) comprising a polysiloxane which, in the cured state, has high heat, oxygen, and ozone resistance; flexibility retention through a range of −80° F. to 450° F.; and a shore hardness (A scale) durometer in the range 20 to 30; and, in the uncured state, has a viscosity indicated by an extrusion rate through an ⅛" orifice at 90 psi of between 200 and 400 gr/min, at room temperature.

8. A method of inside repairing a puncture in a tubeless tire, which puncture has not damaged the tire to the point of unsafe driving, which method comprises the steps of:
(a) applying a self curing adhesive mixture to the inside surface of a puncture,
(b) forcing the adhesive into the puncture hole,
(c) allowing the adhesive to cure sufficiently in the hole merely to avoid being blown out by inflation of the tire to a pressure of about 5 psi greater than the designed pressure of said tire when a puncture of a safe nature is being repaired;
(d) thereafter inflating said tire to about 5 psi greater than its designed pressure, and
(e) allowing the adhesive to cure fully;
whereby a visible indication of an oversized or unsafe puncture is provided either by the blowing out of said adhesive or by a tell tale bulge on the surface of said tire.

* * * * *